Patented Sept. 25, 1923.

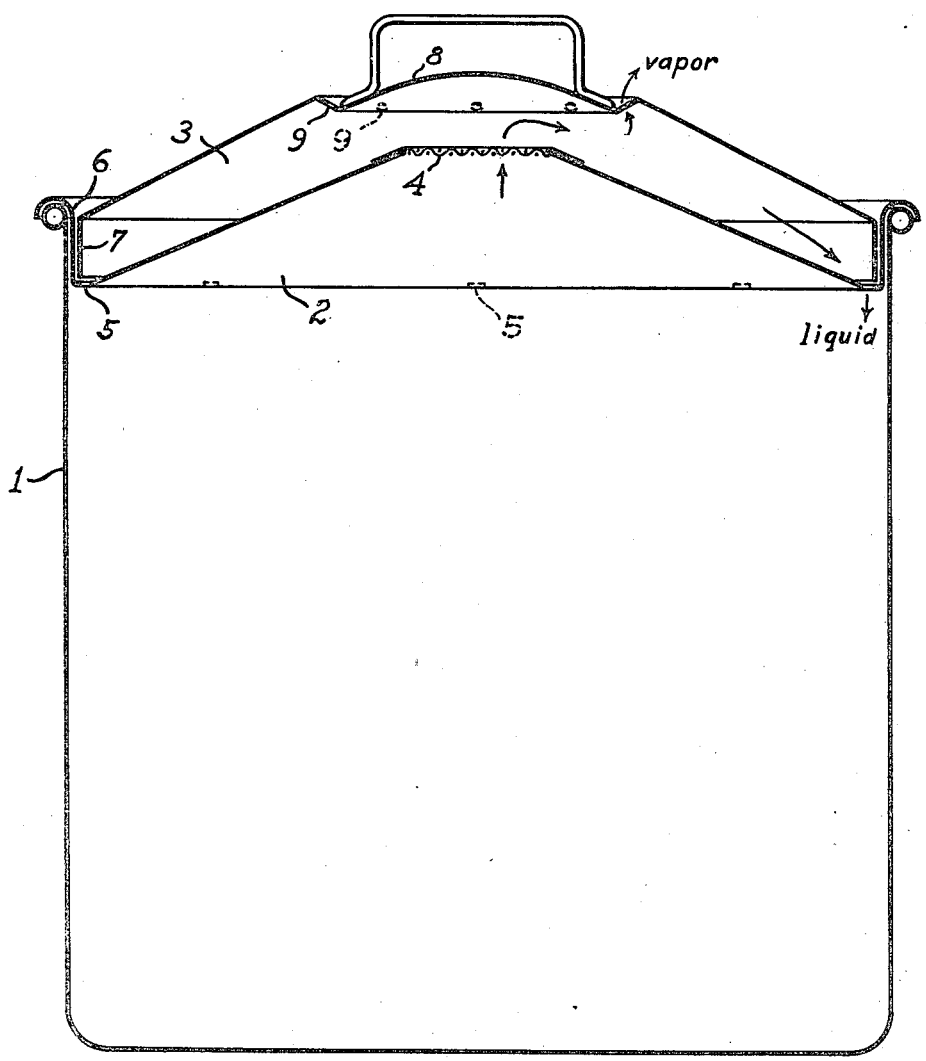

1,468,908

UNITED STATES PATENT OFFICE.

BRUNO A. KRAFFT, OF SAN FRANCISCO, CALIFORNIA.

SAFETY COVER FOR COOKING VESSELS.

Application filed October 4, 1922. Serial No. 592,229.

*To all whom it may concern:*

Be it known that I, BRUNO A. KRAFFT, a citizen of Germany, residing at San Francisco, county of San Francisco, State of California, have invented a new and useful Improvement in a Safety Cover for Cooking Vessels, of which the following is a specification.

This invention relates to domestic cooking utensils, and has for its particular object to provide a safety cover which may be placed on a pot or kettle to prevent it from boiling over or evaporating too rapidly, to retain the flavors and essences, and to prevent loss of heat, and which will be simple in construction, cheap to manufacture, and easy to clean.

The figure on the drawing shows a cross-sectional view of a pot or kettle with the safety cover thereon.

The illustration on the drawing shows one form in which the invention may be embodied, but it is to be understood that the forms and proportions of parts may be varied, and that suitable handles may be attached wherever desired.

The pot or kettle 1 has seated within its periphery an inner cover 2, and over this inner cover is an outer cover 3. The inner cover 2 forms a conical roof over the interior of the vessel 1, the apex of which has a large central opening to allow the boiling material to escape. A wire screen 4 may be secured over or adjacent this opening if it is desired to prevent the escape of large particles of food. Around the outer periphery of the conical portion of the inner cover are a number of holes 5 to allow the material which has boiled over through the screen 4, as well as the liquid that has condensed on the under side of the outer cover 3, to flow back into the vessel. The holes 5 should be slightly larger than the openings through the screen 4 so that solid particles which escape through the screen 4 will be washed back into the vessel again. The inner cover 2 has a rim or flange 6 within which is frictionally fitted the depending flange 7 of the outer cover 3. A central dome 8 is formed on the outer cover to stop any material which may boil over through the opening or screen 4 and cause such material to be deflected sidewise towards the openings 5. Around the periphery of the dome is an annular offset portion having small perforations 9 to allow the escape of vapor so as to prevent any rise of pressure in the interior of the vessel. These perforations are arranged facing radially downwardly towards the periphery of the vessel so that they will not be struck by the direct spray of the liquid boiling over through the opening or screen 4, but will allow the superfluous vapor to escape freely.

Claims:

1. A covering for a cooking vessel comprising inner and outer covers freely separable from each other, said covers having upright cylindrical portions in slidable contact with each other to enable them to be frictionally telescoped together by relative rectilinear sliding movement and forming between them a wide shallow space through which the material passes, said inner cover having a large permanently open aperture near the center thereof to allow boiling material to escape freely at all times, and with peripheral openings to allow the boiled over material and condensed vapor to return into the vessel.

2. A covering for a cooking vessel comprising inner and outer covers freely separable from each other, said covers having upright cylindrical portions in slidable contact with each other to enable them to be slidably and frictionally telescoped together while said cylindrical portions are continuously in engagement with each other and forming between them a wide shallow space through which the material passes, said inner cover sloping downwardly towards its periphery over substantially the entire interior of the vessel and having a large permanently open aperture near the center thereof to allow boiling material to escape freely at all times, and peripheral openings to allow the boiled over material and condensed vapor to return into the vessel.

3. A covering for a cooking vessel comprising an inner cover and an outer cover, said inner cover sloping downwardly towards its periphery and extending laterally over substantially the entire interior of the vessel and having a large opening therethrough near the center thereof to allow the boiling over material to escape and also having an upright substantially cylindrical rim formed directly upon the periphery of the sloping portion and a series of openings along the line where the rim joins the sloping portion to allow the boiled-over material and condensed vapor to return into the vessel, and said outer cover being frictionally fitted within the rim of the inner cover and having small outwardly directed perforations for equalizing the pressure and arranged so that they will not be struck by the direct spray of the boiling-over material.

4. A covering for a cooking vessel comprising an inner cover and a separable outer cover, said inner cover sloping downwardly towards its periphery and extending laterally over substantially the entire interior of the vessel and having a large opening therethrough near the center thereof to allow the boiling material to escape, a screen arranged adjacent said central opening for preventing the escape of large particles of solid matter but allow liquid to escape therethrough, said inner cover having an upwardly extending upright rim formed directly upon the periphery of the sloping portion and a series of openings approximately along the line where the rim joins the sloping portion and of slightly larger size than the openings of the screen to allow the boiled-over material and condensed vapor to return into the vessel, and said outer cover being frictionally fitted to said rim and having openings to allow the escape of the vapor to the atmosphere, said openings being located so that they will not be struck by the direct spray from the boiling over material.

5. A covering for a cooking vessel comprising an inner cover sloping downwardly towards its periphery and extending laterally over the greater portion of the interior of the vessel and a rim comprising an annular flange extending upwardly directly from the periphery of the sloping portion and adapted to be seated within the upper periphery of the vessel, and a separable outer cover having a peripheral portion seated within the rim of the inner cover, said inner cover having a large opening therethrough near the center thereof to permit the liquid to boil over and a screen adjacent said opening to prevent large particles of solid matter from being carried over and a number of openings around the periphery of the sloping portion near the outer margin of the inner cover and slightly larger that the openings through the screen to permit the material which has passed through the central opening to return into the vessel, and said outer cover having a number of openings therethrough each facing radially downwardly so as not to be in the direct path of the spray of the boiling over liquid.

6. A covering for a cooking vessel comprising an inner cover sloping downwardly towards its periphery and extending laterally over the greater portion of the vessel and a rim in the form of an upright substantially cylindrical annular flange extending upwardly directly from the periphery of the sloping portion and having a large opening therethrough near the center thereof through which the liquid may boil over and a series of openings around the margin of the sloping portion to allow the boiled over material to return into the vessel, and a separable outer cover extending over substantially the entire inner cover and slightly spaced therefrom and having a downwardly extending cylindrical portion slidably telescoped into the annular flange of the inner cover and having means for permitting vapor from between the covers to escape into the atmosphere.

7. A covering for a cooking vessel comprising an inner cover and an outer cover, said covers being readily detachable from each other and each extending over substantially the entire interior of the vessel, means for supporting the weight of both of said covers directly upon the uppermost peripheral edge of said vessel while the peripheral portions of both of said covers are disposed below the plane of said uppermost peripheral edge, the peripheral portion of one of said covers being formed cylindrical for substantially its entire height and having frictional engagement with the inner walls of said vessel for a substantial distance below the plane of said uppermost peripheral edge, and said inner cover being impervious throughout the greater portion of the distance from the center to the periphery of the vessel, but having a large hole therethrough near the center thereof.

8. A covering for a cooking vessel comprising an inner cover portion extending laterally over substantially the entire interior of the vessel, said inner cover portion having a large opening therethrough near the center thereof but being impervious throughout the greater portion of the distance from its center to its periphery, a flange extending upwardly from and formed directly upon the periphery of said laterally extending portion, said upwardly extending flange being in direct frictional contact with the inner periphery of the vessel throughout substantially the entire height of the flange, the weight of said laterally extending portion being supported solely by said flange, and a separable outer cover portion having a downwardly extending flange fitting frictionally within said upwardly extending flange.

9. A covering for a cooking vessel comprising an inner cover portion extending laterally over substantially the entire interior of the vessel and sloping downwardly for substantially the entire distance from its center to its periphery, said inner cover portion having a large opening therethrough near the center thereof and a series of openings close along its periphery but being impervious throughout the greater portion of the distance from its center to its periphery, a flange extending upwardly from and formed directly upon the periphery of said laterally extending portion, said upwardly extending flange being in direct frictional contact with the inner periphery of the vessel throughout substantially the entire height of said flange, the weight of said laterally extending portion being supported solely by said flange, and a separable outer cover portion having a downwardly extending flange fitting frictionally within said upwardly extending flange.

BRUNO A. KRAFFT.